US011934145B2

(12) United States Patent
Masuda et al.

(10) Patent No.: US 11,934,145 B2
(45) Date of Patent: Mar. 19, 2024

(54) DEVELOPING APPARATUS, DEVELOPER FOR ELECTROPHOTOGRAPHIC IMAGE FORMATION, ELECTROPHOTOGRAPHIC IMAGE FORMING METHOD, AND ELECTROPHOTOGRAPHIC IMAGE FORMING APPARATUS

(71) Applicants: Minoru Masuda, Shizuoka (JP); Tohru Suganuma, Shizuoka (JP); Masashi Nagayama, Shizuoka (JP); Hiroyuki Kishida, Shizuoka (JP); Kento Takeuchi, Shizuoka (JP); Kaede Masuko, Shizuoka (JP); Tomomi Suzuki, Shizuoka (JP); Takuya Suganuma, Kanagawa (JP); Kazuki Yogosawa, Tokyo (JP)

(72) Inventors: Minoru Masuda, Shizuoka (JP); Tohru Suganuma, Shizuoka (JP); Masashi Nagayama, Shizuoka (JP); Hiroyuki Kishida, Shizuoka (JP); Kento Takeuchi, Shizuoka (JP); Kaede Masuko, Shizuoka (JP); Tomomi Suzuki, Shizuoka (JP); Takuya Suganuma, Kanagawa (JP); Kazuki Yogosawa, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/052,977

(22) Filed: Nov. 7, 2022

(65) Prior Publication Data

US 2023/0195004 A1 Jun. 22, 2023

(30) Foreign Application Priority Data

Dec. 16, 2021 (JP) ................................ 2021-204343

(51) Int. Cl.

*G03G 21/16* (2006.01)
*G03G 9/083* (2006.01)
*G03G 21/00* (2006.01)

(52) U.S. Cl.

CPC ....... *G03G 9/0834* (2013.01); *G03G 21/0047* (2013.01); *G03G 21/1676* (2013.01)

(58) Field of Classification Search

None

See application file for complete search history.

(56) References Cited

U.S. PATENT DOCUMENTS

| | | | |
|---|---|---|---|
| 4,377,334 | A | 3/1983 | Nishikawa |
| 2014/0270838 | A1 | 9/2014 | Yoshizawa et al. |

(Continued)

FOREIGN PATENT DOCUMENTS

| | | |
|---|---|---|
| JP | S54-11173 | 1/1979 |
| JP | 2002-162791 | 6/2002 |

(Continued)

OTHER PUBLICATIONS

U.S. Appl. No. 17/830,391, filed Jun. 2, 2022, Shohtaroh Hoshi, et al.

(Continued)

*Primary Examiner* — Sevan A Aydin
(74) *Attorney, Agent, or Firm* — IPUSA, PLLC

(57) ABSTRACT

A developing apparatus includes an electrostatic latent image bearer, a developing sleeve, a case, and an air filter. The case accommodates a two-component developer and the developing sleeve. The air filter is attached to the case. The air filter has a thickness of 2 to 20 mm and has a density gradient with a pressure loss of 2 to 40 Pa at a wind speed of 10 cm/s. The air filter forms an airflow sucked into the case from a gap between the developing sleeve and the case and forms an airflow discharged from the case through the (Continued)

air filter. The two-component developer accommodated in the case contains a magnetic particle a surface of which is coated with a resin layer. The resin layer contains at least one type of chargeable particle.

5 Claims, 3 Drawing Sheets

(56) References Cited

U.S. PATENT DOCUMENTS

| | | | | |
|---|---|---|---|---|
| 2015/0316891 | A1* | 11/2015 | Satou | G03G 21/203 399/93 |
| 2017/0205721 | A1 | 7/2017 | Murasawa et al. | |
| 2018/0120724 | A1 | 5/2018 | Sakata et al. | |
| 2019/0018331 | A1 | 1/2019 | Takii et al. | |
| 2020/0103778 | A1* | 4/2020 | Takabayashi | G03G 9/1136 |
| 2020/0272066 | A1 | 8/2020 | Satoh et al. | |
| 2021/0063962 | A1* | 3/2021 | Nakazawa | B03C 3/08 |
| 2021/0149327 | A1* | 5/2021 | Lee | G03G 15/0894 |
| 2022/0107605 | A1 | 4/2022 | Hashikawa et al. | |
| 2022/0121138 | A1 | 4/2022 | Yamada et al. | |
| 2022/0203277 | A1* | 6/2022 | Nomura | G03G 13/14 |
| 2022/0291628 | A1* | 9/2022 | Nojima | G03G 15/2017 |
| 2022/0373966 | A1* | 11/2022 | Nakayama | G03G 21/206 |
| 2023/0021525 | A1* | 1/2023 | Fujita | G03G 15/0291 |

FOREIGN PATENT DOCUMENTS

| | | |
|---|---|---|
| JP | 2014-178347 | 9/2014 |
| JP | 2016-212254 | 12/2016 |
| JP | 2018-197835 | 12/2018 |
| JP | 2020-075482 | 5/2020 |
| JP | 2020-134908 | 8/2020 |
| WO | WO2017/159333 A1 | 9/2017 |
| WO | WO2022/074490 A1 | 4/2022 |

OTHER PUBLICATIONS

Extended European Search Report for 22207144.1 dated May 12, 2023.

* cited by examiner

DEVELOPING APPARATUS, DEVELOPER FOR ELECTROPHOTOGRAPHIC IMAGE FORMATION, ELECTROPHOTOGRAPHIC IMAGE FORMING METHOD, AND ELECTROPHOTOGRAPHIC IMAGE FORMING APPARATUS

CROSS-REFERENCE TO RELATED APPLICATION

This patent application is based on and claims priority pursuant to 35 U.S.C. § 119(a) to Japanese Patent Application No. 2021-204343, filed on Dec. 16, 2021, in the Japan Patent Office, the entire disclosure of which is hereby incorporated by reference herein.

BACKGROUND

Technical Field

Embodiments of the present disclosure relate to a developing apparatus, a developer for electrophotographic image formation, an electrophotographic image forming method, and an electrophotographic image forming apparatus.

Related Art

An electrophotographic image forming method using a two-component developer is a method capable of controlling a toner concentration in a two-component developer, thereby obtaining a stable image even in a case of an environmental change. In a two-component developing image forming method, a magnetic brush obtained by allowing the two-component developer in which a toner and a magnetic particle are mixed to be attracted to a rotating developing sleeve with a magnetic force, is allowed to rub an electrostatic latent image bearer, and an electrostatic latent image on a surface of the electrostatic latent image bearer is developed to form a toner image.

In the two-component developer, the toner and the magnetic particle adhere to each other by an electrostatic force, and the toner might be separated from the magnetic particle. If the toner is separated from the magnetic brush, the toner may be scattered in the image forming apparatus, thus preventing the image forming apparatus from operating normally.

Therefore, for example, a technology has been proposed in which chargeable particles are contained in a coating film and exposed in order to maintain charging of the carrier and the toner, maintain electrostatic adhesion, and improve toner scattering.

SUMMARY

According to an embodiment of the present disclosure, a developing apparatus includes an electrostatic latent image bearer, a developing sleeve, a case, and an air filter. The electrostatic latent image bearer bears an electrostatic latent image on a surface of the electrostatic latent image bearer. The developing sleeve attracts a two-component developer containing a toner and a magnetic carrier to a surface of the developing sleeve by a magnetic force to form a magnetic brush and rub the magnetic brush against the surface of the electrostatic latent image bearer to develop the electrostatic latent image on the surface of the electrostatic latent image bearer into a toner image. The case accommodates the two-component developer and the developing sleeve. The air filter is attached to the case. The air filter has a thickness of 2 to 20 mm and has a density gradient with a pressure loss of 2 to 40 Pa at a wind speed of 10 cm/s. The air filter forms an airflow sucked into the case from a gap between the developing sleeve and the case and forms an airflow discharged from the case through the air filter. The two-component developer accommodated in the case contains a magnetic particle a surface of which is coated with a resin layer. The resin layer contains at least one type of chargeable particle.

According to another embodiment of the present disclosure, a developer for electrophotographic image formation is for use in the developing apparatus.

According to still another embodiment of the present disclosure, an electrophotographic image forming method includes forming an image with the developer.

According to still yet another embodiment of the present disclosure, an electrophotographic image forming apparatus includes the developer.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
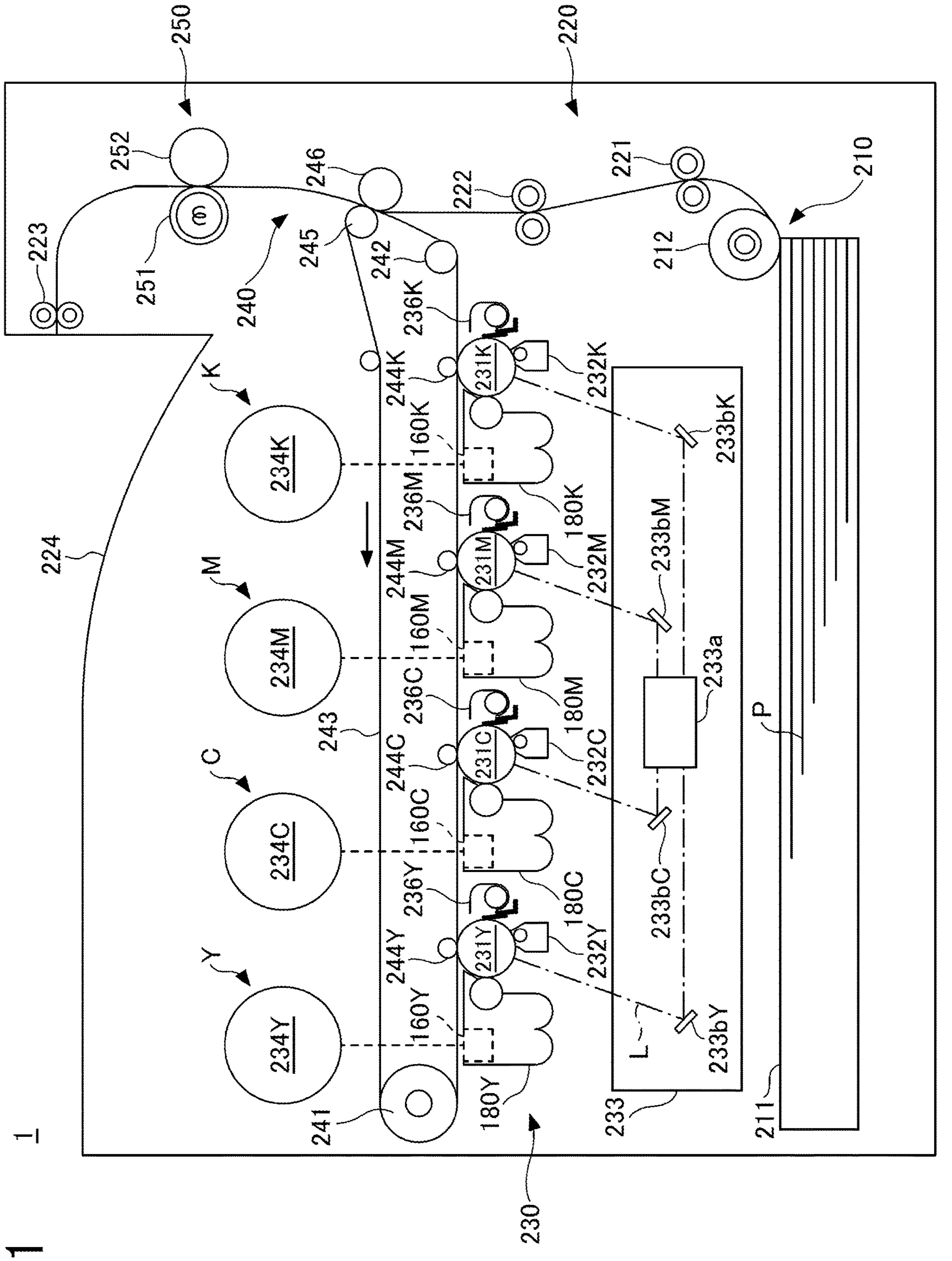
FIG. 1 is a schematic diagram illustrating an example of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Developing Apparatus

Figure 2:
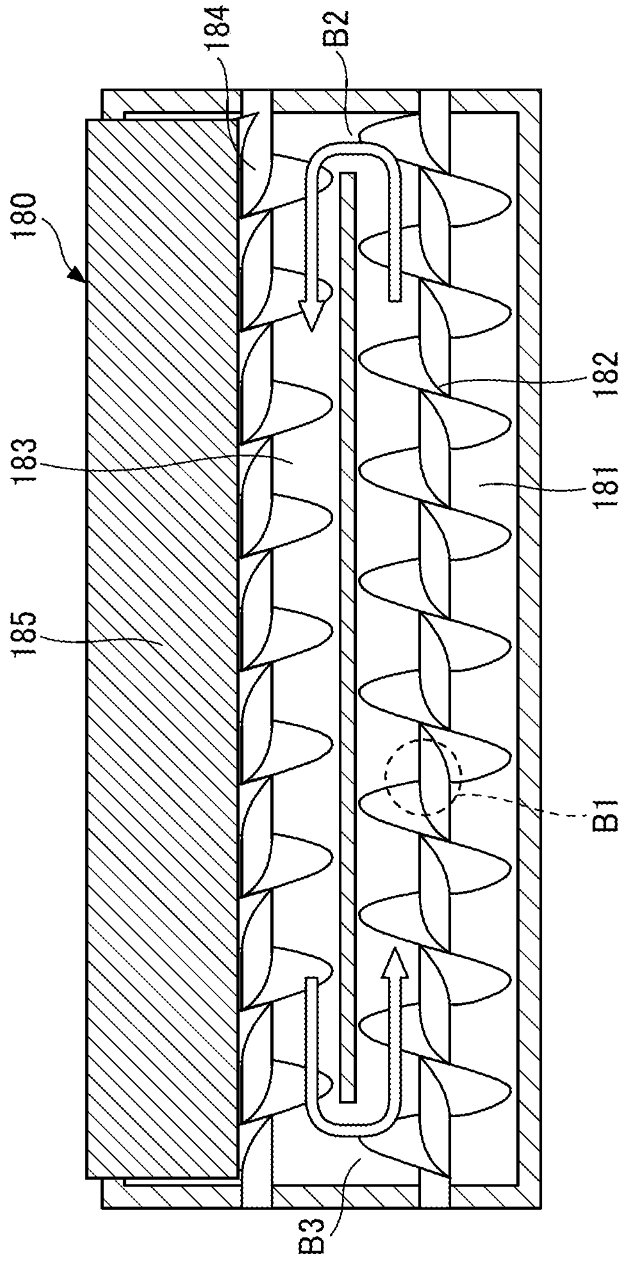
FIG. 2 is a cross-sectional view illustrating a developing device of FIG. 1.
Figure 3:
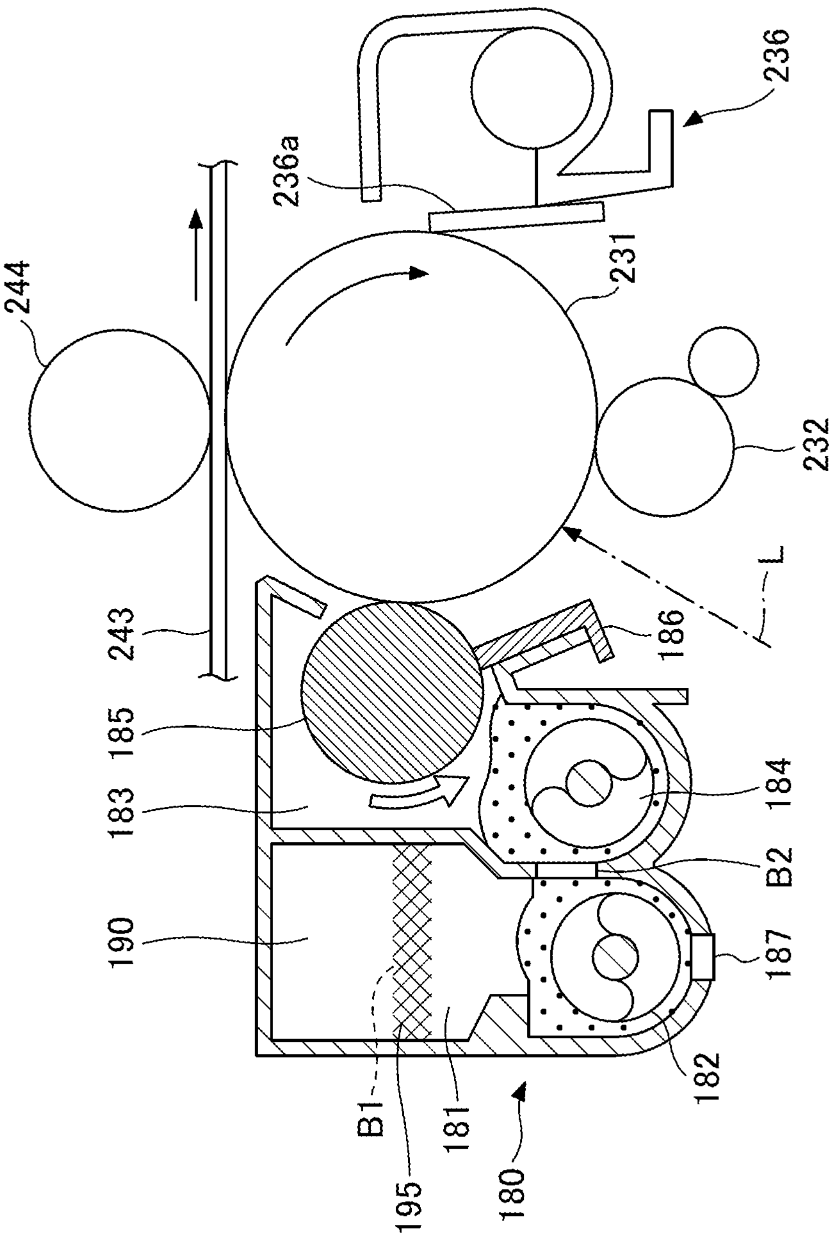
FIG. 3 is a cross-sectional view illustrating an image forming device of FIG. 1.

FIG. 1 is an example of an image forming apparatus that implements a developing apparatus according to this embodiment. FIG. 2 is a transverse cross-sectional view illustrating a developing device, which is a part of the image forming apparatus of FIG. 1. FIG. 3 is a cross-sectional view illustrating an image forming device (including the developing device), which is a part of the image forming apparatus of FIG. 1. In this embodiment, a printer is exemplified as an example of the image forming apparatus, but there is no limitation, and other image forming apparatuses such as a copying machine, a facsimile, and a multifunction peripheral may be used.

An image forming apparatus 1 of this embodiment includes a sheet feeder 210, a conveyor 220, an image forming device 230, a transfer device 240, and a fixing device 250.

The sheet feeder 210 includes a sheet tray 211 in which sheets P to be fed are stacked, and a sheet feeding roller 212 that feeds the sheets P stacked in the sheet tray 211 one by one.

The conveyor 220 includes a roller 221, a pair of timing rollers 222, and a sheet ejection roller 223. The roller 221 conveys the sheet P fed by the sheet feeding roller 212 toward the transfer device 240. The pair of timing rollers 222 stands by while pinching a leading end of the sheet P conveyed by the roller 221, and delivers the sheet P to the transfer device 240 at a predetermined timing. The sheet ejection roller 223 ejects the sheet P on which a color toner image is fixed to a sheet ejection tray 224.

As illustrated in FIG. 1, the image forming device 230 includes an image forming unit Y, an image forming unit C, an image forming unit M, an image forming unit K, and an exposure device 233 in this order from left to right at predetermined intervals.

The image forming unit Y forms an image using a developer containing a yellow toner. The image forming unit C uses a developer containing a cyan toner. The image forming unit M uses a developer containing a magenta toner. The image forming unit K uses a developer containing a black toner.

Hereinafter, any of the image forming units Y, C, M, and K will be simply referred to as the image forming unit.

The developer contains a toner and a carrier. The four image forming units Y, C, M, and K have substantially the same mechanical configuration except that the developers contained therein are different.

The image forming units Y, C, M, and K are provided to be rotatable clockwise in FIG. 1. The image forming units Y, C, M, and K include photoconductor drums 231Y, 231C, 231M, and 231K, chargers 232Y, 232C, 232M, and 232K, developing devices 180Y, 180C, 180M, and 180K, and cleaners 236Y, 236C, 236M, and 236K, respectively.

An electrostatic latent image and a toner image are formed on the photoconductor drums 231Y, 231C, 231M, and 231K. Hereinafter, any of the photoconductor drums 231Y, 231C, 231M, and 231K will be simply referred to as the photoconductor drum 231.

The chargers 232Y, 232C, 232M, and 232K uniformly charge a surface of the photoconductor drums 231Y, 231C, 231M, and 231K, respectively. Hereinafter, any of the chargers 232Y, 232C, 232M, and 232K will be simply referred to as the charger 232.

The developing devices 180Y, 180C, 180M, and 180K develop the electrostatic latent images on the surface of the photoconductor drums 231Y, 231C, 231M, and 231K into toner images by the exposure device 233 using toners of respective colors. Hereinafter, any of the developing devices 180Y, 180C, 180M, and 180K will be simply referred to as the developing device 180.

The cleaners 236Y, 236C, 236M, and 236K include a doctor blade 236A, and removes the toner remaining on the surface of the photoconductor drums 231Y, 231C, 231M, and 231K with the doctor blade 236A. Hereinafter, any of the cleaners 236Y, 236C, 236M, and 236K will be simply referred to as the cleaner 236.

The image forming units Y, C, M, and K include toner cartridges 234Y, 234C, 234M, and 234K and sub hoppers 160Y, 160C, 160M, and 160K, respectively.

The toner cartridges 234Y, 234C, 234M, and 234K accommodate the toners of respective colors. Hereinafter, any of the toner cartridges 234Y, 234C, 234M, and 234K will be simply referred to as the toner cartridge 234.

The sub hoppers 160Y, 160C, 160M, and 160K supply the toners supplied from the toner cartridges 234Y, 234C, 234M, and 234K, respectively. Hereinafter, any of the sub hoppers 160Y, 160C, 160M, and 160K will be simply referred to as the sub hopper 160.

The toner accommodated in the toner cartridge 234 is discharged by a suction pump and supplied to the sub hopper 160 via a supply pipe. The sub hopper 160 conveys the toner supplied from the toner cartridge 234 to supply to the developing device 180. The developing device 180 develops the electrostatic latent image on the photoconductor drum 231 using the toner supplied by the sub hopper 160.

Examples of the photoconductor drum 231 include, but are not limited to, an inorganic photoconductor drum such as an amorphous silicon photoconductor drum and a selenium photoconductor drum, and an organic photoconductor drum such as a polysilane photoconductor drum and a phthalopolymethine photoconductor drum.

Examples of the charger 232 include, but are not limited to, a known contact charger including a conductive or semiconductive roll, a brush, a film, and a rubber blade, and a non-contact charger using corona discharge such as corotron and scorotron.

Preferably, the charger 232 is disposed in contact with or not in contact with the photoconductor drum 231, and superimposes/applies a direct current (DC) voltage and an alternating current (AC) voltage to charge the surface of the photoconductor drum 231.

The charger 232 is a charging roller disposed close to the photoconductor drum 231 in a non-contact manner via a gap tape, and preferably superimposes/applies the DC voltage and the AC voltage to the charging roller to charge the surface of the photoconductor drum 231.

The exposure device 233 reflects laser light L emitted from a light source 233*a* based on image information by polygon mirrors 233*b* (233*b*Y, 233*b*C, 233*b*M, and 233*b*K) rotary driven by a motor, and irradiates the photoconductor drums 231 (231Y, 231C, 231M, and 231K) with the laser light L.

The exposure device 233 is not particularly limited as long as this may expose image-wise the surface of the photoconductor drum 231 charged by the charger 232. Examples of the exposure device 233 include various exposure devices such as a copying optical system, a rod lens array system, a laser optical system, and a liquid crystal shutter optical system.

An optical backplane system of performing exposure image-wise from the backplane side of the photoconductor drum 231 may be adopted.

The developing device 180 is not particularly limited as long as this may develop using the developer. As the developing device 180, the developing device that accommodates the developer and applies the developer to the electrostatic latent image in a contact or non-contact manner is preferable, and the developing device including a container containing the developer is more preferable.

The developing device 180 may be a monochromatic developing device or a multicolor developing device.

The cleaner 236 is not particularly limited as long as this may remove the toner remaining on the surface of the photoconductor drum 231. As the cleaner 236, the cleaner including a cleaning member such as a magnetic brush cleaner, an electrostatic brush cleaner, a magnetic roller cleaner, a blade cleaner, a brush cleaner, and a web cleaner is preferable.

The photoconductor drum 231 from which the toner is removed by the cleaner 236 is neutralized, and residual potential is removed, a series of image forming processes performed on the photoconductor drum 231 ends.

The transfer device 240 includes a driving roller 241, a driven roller 242, an intermediate transfer belt 243, primary transfer rollers 244Y, 244C, 244M, and 244K, a secondary counter roller 245, and a secondary transfer roller 246.

The driving roller 241 is provided on the toner cartridge 234Y side of the image formation unit Y. The driven roller 242 is provided on the toner cartridge 234K side of the image forming unit K. The intermediate transfer belt 243 is rotatable counterclockwise in FIG. 1 in accordance with the driving of the driving roller 241.

The primary transfer rollers 244Y, 244C, 244M, and 244K are provided so as to be opposed to the photoconductor drum 231 with the intermediate transfer belt 243 interposed therebetween. The secondary counter roller 245 and the secondary transfer roller 246 are provided so as to be opposed to each other with the intermediate transfer belt 243 interposed therebetween at a transfer position of the toner image onto the sheet P. Hereinafter, any of the primary transfer rollers 244Y, 244C, 244M, and 244K will be simply referred to as the primary transfer roller 244.

A primary transfer bias having a polarity opposite to a polarity of the toner is applied to the primary transfer roller 244. The intermediate transfer belt 243 is interposed between the primary transfer roller 244 and the photoconductor drum 231 and a primary transfer nip is formed.

As a result, the toner images of the respective colors on the surface of the photoconductor drums 231 are transferred (primarily transferred) onto the intermediate transfer belt 243. In this case, when the intermediate transfer belt 243 rotates in an arrow direction in FIG. 1, the toner images of the respective colors on the photoconductor drums 231Y, 231C, 231M, and 231K are sequentially transferred onto the intermediate transfer belt 243 to form the color toner image.

A secondary transfer bias is applied to the secondary transfer roller 246 of the transfer device 240. The intermediate transfer belt 243 is interposed between the secondary counter roller 245 and the secondary transfer roller 246, and a secondary transfer nip is formed. As a result, the color toner image on the intermediate transfer belt 243 is transferred (secondarily transferred) onto the sheet P interposed between the secondary transfer roller 246 and the secondary counter roller 245.

The fixing device 250 includes a fixing belt 251 with an internally provided heater that heats the sheet P, and a pressure roller 252 that rotatably pressurizes the fixing belt 251 to form a nip. The color toner image on the sheet P is applied with heat and pressure, and the color toner image is fixed. The sheet P on which the color toner image has been fixed is ejected onto the sheet ejection tray 224 by the sheet ejection roller 223, and a series of image forming processes is completed.

Next, a configuration of the developing device and the image forming device including the developing device are described in further detail with reference to FIGS. 2 and 3.

The developing device 180 includes a first accommodating unit 181, a first conveying screw 182 provided in the first accommodating unit 181, a second accommodating unit 183, a second conveying screw 184 provided in the second accommodating unit 183, a developing roller 185, a doctor blade 186, and a concentration detecting sensor 187. The first accommodating unit 181 and the second accommodating unit 183 accommodate the carrier in advance.

A supply port B1 connected to the sub hopper 160 is formed on the first accommodating unit 181. The supply of the toner by the sub hopper 160 is controlled based on a detection result by the concentration detecting sensor 187 so that a ratio of the toner in the developer (toner concentration) falls within a predetermined range.

The toner supplied to the first accommodating unit 181 circulates through the first accommodating unit 181 and the second accommodating unit 183 in an arrow direction in FIG. 2 via communication holes B2 and B3 while being mixed and stirred with the carrier by the first conveying screw 182 and the second conveying screw 184. At that time, the circulating toner is attracted to the carrier by frictional charging.

The developing roller 185 is accommodated in the second accommodating unit 183 except for a portion opposed to the photoconductor drum 231.

The developing roller 185 includes a magnet roller, and the toner conveyed in the second accommodating unit 183 is attracted to the developing roller 185 together with the carrier by a magnetic force generated by the magnet roller. The developing roller 185 rotates in an arrow direction in FIG. 3, and the developer attracted to the developing roller 185 is conveyed with the rotation of the developing roller 185, and a thickness thereof is regulated by the doctor blade 186.

The developer the thickness of which is regulated is conveyed to a position opposed to the photoconductor drum 231 by the developing roller 185, and the toner is attracted to the electrostatic latent image on the photoconductor drum 231. As a result, the toner image is formed on the photoconductor drum 231. The developer that has consumed the toner on the developing roller 185 is returned to the second accommodating unit 183 with the rotation of the developing roller 185. The developing roller 185 is an example of a developing sleeve in the developing apparatus of this embodiment.

The developer that has consumed the toner is conveyed in the second accommodating unit 183 by the second conveying screw 184, and is returned to the first accommodating unit 181 via the communication hole B3.

In the developing device 180, a two-component developer to be described later is used. Hereinafter, the developing device is sometimes referred to as a developing unit. The two-component developer contains the toner and the carrier, which is a magnetic particle (hereinafter, sometimes referred to as a magnetic carrier).

In the image forming apparatus 1 of this embodiment, in the developing device 180 (developing unit), the two-component developer (hereinafter, sometimes referred to as the developer) in which the toner and the magnetic carrier are mixed is attracted to the rotating developing roller 185 (developing sleeve) by a magnetic force to form a magnetic brush. The developing roller 185 is an example of the developing sleeve in the developing apparatus.

The photoconductor drum 231 on which the electrostatic latent image is formed is rubbed with the magnetic brush, and the electrostatic latent image is developed on the photoconductor drum 231 to form the toner image. The photoconductor drum 231 is an example of an electrostatic latent image bearer in the developing apparatus.

In the developing device 180 that holds the two-component developer in this manner, the developing roller 185 is accommodated in the second accommodating unit 183, and the developer is put on the developing roller 185 to be moved toward the photoconductor drum 231. For this reason, a gap is provided in the second accommodating unit 183. After the toner is developed on the photoconductor drum 231, a gap for returning the developer to the second accommodating unit 183 is provided. The second accommodating unit 183 is an example of a case in the developing apparatus.

A part of the developer in the developing roller 185 is outside the second accommodating unit 183 from where the toner separated from the carrier is often scattered. Therefore, by creating an airflow (hereinafter, referred to as a suction airflow) sucked into the developing roller 185 in a gap between the second accommodating unit 183 and the developing roller 185, the scattered toner may be returned into the second accommodating unit 183.

As a result, the toner scattering into the image forming apparatus 1 may be significantly reduced. However, in order to create the suction airflow in the gap between the second accommodating unit 183 and the developing roller 185, it is necessary to discharge air from other developing unit position. At that time, the toner scattering from this portion poses a problem.

Therefore, a portion from where the toner is likely to be scattered of the developing device 180 is equipped with a filter 195 described below and the toner scattering from the inside of the developing device 180 is reduced. In this embodiment, the filter 195 is attached to the supply port B1 of the developing device 180.

Filter

The filter 195 of the present embodiment is a filter having a thickness of 2 to 20 mm and a density gradient with a pressure loss of 2 to 40 Pa at a wind speed of 10 cm/s. Since there is the density gradient in a thickness direction with the thickness of 2 to 20 mm and the filter 195 becomes coarse toward the inside of the developing device 180, the toner is less likely to be clogged, and an effect of the filter 195 may be maintained for a long period of time. The filter 105 is an example of an air filter in the developing apparatus.

The pressure loss of the filter 195 at the wind speed of 10 cm/s is preferably 5 to 30 Pa. When the pressure loss is 2 Pa or smaller, the filter becomes coarse, and the toner leaks from the filter occurs. When the pressure loss is 40 Pa or larger, the filter becomes too fine and the toner is easily clogged, so that air is no longer discharged from the filter at an early stage, and the suction airflow from the gap of the developing sleeve cannot be maintained.

Regarding the airflow of the developing apparatus, it is preferable to install a fan in the image forming apparatus to form a path through which air is discharged.

In the example illustrated in FIG. 3, a gap is formed between the developing device 180 and the developing roller 185, and the toner separated from the developer or the toner from the magnetic brush outside the developing device 180 scatter. The filter 195 is installed in the supply port B1, and an airflow (hereinafter, referred to as a discharge airflow) to be discharged out of the developing device 180 from a portion of a space 190 through the filter 195 is created.

As a result, in this embodiment, the suction airflow is generated in the developing device 180 from the gap between the developing roller 185 and the developing device 180, and the scattered toner may be returned into the developing device 180.

Developer

The developer of the present embodiment is the two-component developer containing the carrier and the toner.

Carrier

The carrier of the present embodiment is formed of the magnetic particle a surface of which is coated with a resin layer, and the resin layer contains at least one or more types of chargeable particle. That is, a coating layer of the carrier contains the chargeable particle.

In this embodiment, the carrier coating layer contains the chargeable particle, which can reduce a decrease in charging ability of the carrier when the toner is supplied and consumed in a high image area by a charge imparting function thereof, and can reduce the toner scattering accompanying a decrease in charging.

Particularly, by combining with the above-described developing unit (developing device 180), an amount of toner adhering to the filter is decreased, a decrease in airflow due to clogging of the filter is reduced, and the toner scattering can be prevented for a long period of time. As a result, in this embodiment, the toner scattering can be efficiently reduced, and the developing apparatus is provided that can prevented the toner scattering over a long period of time and minimizing maintenance to obtain a stable image quality.

The chargeable particle refers to a particle having relatively low ionization potential, and specifically refers to a particle having lower ionization potential than that of an alumina particle (AA-03 manufactured by Sumitomo Chemical Co., Ltd.). For measurement of the ionization potential, for example, an ionization potential measuring device (PYS-202 manufactured by Sumitomo Heavy Industries, Ltd.) is used.

Examples of the chargeable particle preferably include barium sulfate, zinc oxide, magnesium oxide, magnesium hydroxide, and hydrotalcite, and among them, barium sulfate is more preferable.

By using barium sulfate, zinc oxide, magnesium oxide, magnesium hydroxide, and hydrotalcite as the chargeable particle, the charging of the carrier may be stably maintained. Accordingly, the developer and the toner are electrostatically attracted to each other, the toner scattering can be more efficiently reduced.

In a case where barium sulfate is used as the chargeable particle, an exposure amount of a barium element on a surface of the coating layer is preferably 0.2 atomic % or larger, and more preferably 0.3 atomic % or larger. Since charge exchange is performed in the surface layer of the coating layer, for charging the toner, in the case of a carrier in which the exposure of barium sulfate to the surface of the coating layer is extremely small, the charge imparting ability of barium sulfate is exhibited only when the coating layer is largely scraped off by a long-term use of the carrier.

The exposure amount of the barium element on the surface layer of the carrier may be detected by atomic % of the barium element calculated by peak analysis with an X-ray photoelectron spectroscopic analyzer (XPS analyzer) (AXIS/ULTRA manufactured by Shimadzu Corporation/Kratos Analytical Ltd.). In the XPS analyzer, a beam irradiation region is about 900 μm×600 μm, and detection is performed in a range of 25 carriers×17. A penetration depth is 0 to 10 nm, and information near the carrier surface layer of is detected.

A specific measurement method is performed in a measuring mode: Al: 1486.6 eV, excitation source: monochrome (Al), detection method: spectral mode, magnet lens: off. First, a detection element is specified by wide-area scanning, and then a peak is detected by narrow scanning for each detection element. Thereafter, atomic % of barium with respect to all the detection elements is calculated with attached peak analysis software.

The exposure amount of the barium element is an example of a barium element concentration by the XPS analysis. When the exposure amount of the barium element on the surface of the coating layer surface is 0.2 atomic % or larger, not only when the coating layer is scraped, but also when a toner component adheres to the carrier surface layer (so-called spent) due to long-term use, the charge imparting ability may be exhibited, which is preferable.

A particle diameter of the chargeable particle is not particularly limited, but when an average thickness of the total resin layer is set to T, a particle diameter h preferably satisfies the following formula.

$$h/2 \leq T \leq h$$

By making the particle diameter of the chargeable particle larger than the thickness of the resin layer, it becomes more likely that the chargeable particle protrudes from a resin coating layer surface. When the top portion of the chargeable particle protrudes from the resin coating layer, it functions as a spacer between an object to be rubbed and the resin of the coating layer when the carriers are rubbed with each other or with an accommodating container wall or a conveyance jig, thus extending the lifespan of the coating layer.

It becomes more likely that the chargeable particle comes into contact with the toner, which is preferable in terms of charge imparting function. When the thickness T of the resin layer is larger than half the particle diameter of the chargeable particle, the chargeable particle may be firmly trapped in the resin layer, so that detachment of the chargeable particle from the resin coating layer is less likely to occur.

The particle diameter of the chargeable particle may be confirmed by a conventionally known method, and for example, before this is made a carrier, the particle diameter may be measured using, for example, a particle size distribution measuring device (Nanotrac UPA series manufactured by Nikkiso Co., Ltd.). After this is made a carrier, for example, it is possible to cut the coating layer on the carrier surface with a focused ion beam (FIB), and observe a cross section with a scanning electron microscope (SEM) and energy dispersive X-ray analyzer (EDX), thereby confirming the same. Another example is described below.

The carrier is mixed into an embedded resin (dual-liquid mixing, 30-minute curable epoxy resin, manufactured by Devcon Corporation) and left to cure overnight, then a rough cross-sectional sample is prepared by mechanical polishing. A cross section polisher (SM-09010 manufactured by JEOL Ltd.) is used to finish the cross section under the conditions of an acceleration voltage of 5.0 kV and a beam current of 120 μA.

This is photographed using a scanning electron microscope (MERLIN® manufactured by Carl Zeiss AG) under the conditions of an acceleration voltage of 0.8 kV and a magnification of 30,000 times. The photographed image is captured in a tag image file format (TIFF) image, a diameter equivalent to a circle of 100 barium sulfate particles is measured using image analysis software (Image-Pro Plus manufactured by Media Cybernetics, Inc.), and an average value thereof is used.

The confirming method is not limited to the above-described method. The thickness of the coating layer may be measured from the photographed image in the similar manner. Since each particle has an individual difference and the thickness of the coating layer varies depending on the location, not only one particle or one location is subjected to the measurement, but a statistically reliable "n" number of particles or locations is subjected to the measurement.

A core particle used for an image forming carrier of the present embodiment may be appropriately selected from those known as electrophotographic two-component carriers according to a purpose. Especially, since Mn ferrite is a material having relatively high magnetization, this is suitable because it is easy to set a magnetic moment per carrier to an appropriate range from the viewpoint of carrier adhesion resistance.

The magnetization of the carrier in a magnetic field of 1,000 is preferably 56 [$Am^2/kg$] or greater but less than 73 [$Am^2/kg$].

Even if internal porosity is decreased to increase mass of one particle, when the magnetization is less than 56 [$Am^2/kg$], the magnetic moment per particle is decreased, so that carrier adhesion is likely to occur. When the magnetization is 56 [$Am^2/kg$] or greater, not only carrier adhesion is less likely to occur, but also the carriers on the developer carrier are rubbed with each other with a strong force, so that scraping of the adhered material described above is promoted, which is preferable from the viewpoint of maintaining the charging ability of the carrier.

When the magnetization of the carrier is 72 [$Am^2/kg$] or greater, the magnetization is too high, so that the developer of which toner concentration lowers after development does not separate from the developing roller and enters the developing region again as is. Image density after the second turn of the developing roller of a solid image decreases, and a vertical band-shaped abnormal image is likely to be generated.

In order to bring the magnetization of the carrier into the above-described range, the magnetization of the core material is preferably 66 $Am^2/kg$ or greater but less than 75 $Am^2/kg$ in a magnetic field of 1,000 Oe.

The magnetization of the carrier core material was measured using a room temperature-only vibrating sample magnetometer (VSM) (VSM-P7 manufactured by Toei Industry Co., Ltd.), and the external magnetic field was continuously applied for one cycle in the range from 0 to 1,000 and magnetization $\sigma 1{,}000$ in the external magnetic field 1,000 was measured.

The coating layer preferably contains a conductive material for resistance adjustment.

Conventionally, carbon black has been widely used as the conductive material. When this is used as the developer for a long period of time, carbon black or a resin piece containing carbon black is detached from the carrier coating layer due to friction or collision between the carriers or with the toner, and adheres to the toner particle or is developed as it is. Particularly when the developer is that combined with yellow toner, white toner, or transparent toner, an undesired phenomenon of color turbidity (i.e., color contamination) remarkably appears.

Therefore, it is preferable that the conductive material be close to white or colorless as much as possible. Examples of materials having good color and conductive function include doped tin oxides that are doped with tungsten, indium, or phosphorus, or an oxide of any of these substances. These doped tin oxides can be used as they are or provided to the surfaces of base particles.

As the base particles, either known or new material can be used. Examples thereof include aluminum oxide and titanium oxide.

The coating resin of the carrier may include a silicone resin, an acrylic resin, or a combination thereof. Acrylic resins have high adhesiveness and low brittleness and thereby exhibit superior wear resistance. At the same time, acrylic resins have a high surface energy. Therefore, when used in combination with a toner which easily cause adhesion, the adhered toner components may be accumulated on the acrylic resin to cause a decrease of the amount of charge.

In this case, by using the silicone resin to which the toner components are difficult to adhere due to its low surface energy, capable of obtaining an effect that the adhered components causing film peeling are difficult to be accumulated, this problem may be solved.

At the same time, the silicone resins have low adhesiveness and high brittleness and thereby exhibit poor wear resistance. Thus, it is preferable that these two types or resins be used in a good balance to provide a coating layer having wear resistance to which the toner is difficult to adhere. This is because, since the silicone resin has low surface energy, the toner components are difficult to adhere, and an effect that the adhered components causing film peeling are difficult to be accumulated.

The silicone resin as used herein refers to all generally known silicone resins. Examples of the silicone resin include, but are not limited to, straight silicon including only of an organosiloxane bond, and silicone resins modified with alkyd, polyester, epoxy, acrylic, and urethane, for example.

Specific examples of commercially-available products of the straight silicone resins include KR271, KR255, and KR152 (products of Shin-Etsu Chemical Co., Ltd.); and SR2400, SR2406, and SR2410 (products of Dow Corning Toray Silicone Co., Ltd.). Each of these silicone resins may be used alone or in combination with a cross-linking component and/or a charge amount controlling agent.

Specific examples of the modified silicone resins include commercially-available products such as KR206 (alkyd-modified), KR5208 (acrylic-modified), ES1001N (epoxy-modified), and KR305 (urethane-modified) (products of Shin-Etsu Chemical Co., Ltd.); and SR2115 (epoxy-modified) and SR2110 (alkyd-modified) (products of Dow Corning Toray Silicone Co., Ltd.).

Examples of catalyst for polycondensation include a titanium-based catalyst, a tin-based catalyst, a zirconium-based catalyst, and an aluminum-based catalyst. Among them, titanium-based catalyst is preferable, and among the titanium-based catalyst, titanium diisopropoxybis (ethyl acetoacetate) is more preferable. The reason for this is considered that this catalyst effectively accelerates condensation of silanol groups and is less likely to be deactivated.

The acrylic resin as used herein refers to all resins having an acrylic component, and is not particularly limited. Each of these acrylic resins may be used alone or in combination with at least one cross-linking component. Examples of the cross-linking component include, but are not limited to, an amino resin and an acidic catalyst, for example.

Examples of the amino resin include, but are not limited to, guanamine and a melamine resin, for example. The acidic catalyst indicates that having a catalytic action. The acidic catalyst has a reactive group such as a fully alkylated type, a methylol group type, an imino group type, and a methylol/imino group type, for example, but is not limited thereto.

More preferably, the coating layer contains a cross-linked product of an acrylic resin and an amino resin. In this case, the coating layers are prevented from fusing with each other while maintaining proper elasticity.

Examples of the amino resin include, but are not limited to, a melamine resin and a benzoguanamine resin, which may improve charge imparting ability of the resulting carrier. To more suitably control the charge imparting ability of the resulting carrier, at least one of the melamine resin and benzoguanamine resin may be used in combination with another amino resin.

Preferred examples of the acrylic resin that is cross-linkable with the amino resin include those having at least one of a hydroxyl group and a carboxyl group. Those having a hydroxy group are more preferred. In this case, adhesiveness to the core particle and conductive particles may be more improved, and dispersion stability of the conductive particles may also be improved. In this case, preferably, the acrylic resin has a hydroxyl value of 10 mg KOH/g or more, and more preferably 20 mg KOH/g or more.

In the present embodiment, a composition for the coating layer preferably contains a silane coupling agent. In this case, the conductive particles may be stably dispersed therein.

Examples of the silane coupling agent include, but are not limited to, r-(2-aminoethyl) aminopropyltrimethoxysilane, r-(2-aminoethyl) aminopropylmethyldimethoxysilane, r-methacryloxypropyltrimethoxysilane, N-β-(N-vinylbenzylaminoethyl)-r-aminopropyltrimethoxysilane hydrochloride, r-glycidoxypropyltrimethoxysilane, r-mercaptopropyltrimethoxysilane, methyltrimethoxysilane, methyltriethoxysilane, vinyltriacetoxysilane, r-chloropropyltrimethoxysilane, hexamethyldisilazane, r-anilinopropyltrimethoxysilane, vinyltrimethoxysilane, octadecyldimethyl [3-(trimethoxysilyl) propyl]ammonium chloride, r-chloropropylmethyldimethoxysilane, methyltrichlorosilane, dimethyldichlorosilane, trimethylchlorosilane, allyltriethoxysilane, 3-aminopropylmethyldiethoxysilane, 3-aminopropyltrimethoxysilane, dimethyldiethoxysilane, 1,3-divinyltetramethyldisilazane, and methacryloxyethyldimethyl (3-trimethoxysilylpropyl) ammonium chloride, and two or more of them may be used in combination.

Specific examples of commercially-available products of the silane coupling agents include AY43-059, SR6020, SZ6023, SH6026, SZ6032, SZ6050, AY43-310M, SZ6030, SH6040, AY43-026, AY43-031, sh6062, Z-6911, sz6300, sz6075, sz6079, sz6083, sz6070, sz6072, Z-6721, AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, and Z-6940 (products of Toray Silicone Co., Ltd.).

Preferably, the proportion of the silane coupling agent to the silicone resin is from 0.1% to 10% by mass. When the proportion of the silane coupling agent is less than 0.1% by mass, adhesion strength between the core particle/conductive particle and the silicone resin may be reduced to cause detachment of the coating layer during a long-term use. When the proportion exceeds 10% by mass, toner filming may occur in a long-term use.

A volume average particle diameter of the core material of the carrier used in the present disclosure is not particularly limited, but the volume average particle diameter is preferably 20 μm or larger from the viewpoint of preventing carrier adhesion and carrier scattering. From the viewpoint of preventing occurrence of an abnormal image such as a carrier streak and preventing deterioration in image quality, the volume average particle diameter is preferably 100 μm or smaller. Particularly, by using the core material having the volume average particle diameter of 20 to 60 μm, it is possible to more suitably respond to recent image quality improvement.

The volume average particle diameter (hereinafter, referred to as an average particle diameter) may be measured using, for example, a laser diffraction/scattering particle size distribution measuring apparatus (MICROTRACK particle size distribution meter model HRA9320-X100 manufactured by Nikkiso Co., Ltd.).

Toner

The toner is contained in the two-component developer together with the carrier. The toner of the present embodiment contains a binder resin, and may be any of a monochrome toner, a color toner, a white toner, a transparent toner, and a toner having metallic gloss. A production method thereof may be a conventionally known method such as a pulverization method or a polymerization method, or may be another production method.

In a typical pulverization method, for example, toner materials are melt-kneaded, the melt-kneaded product is cooled and pulverized into particles, and the particles are classified by size, thus preparing mother particles. To more improve transferability and durability, an external additive is added to the mother particles, thus obtaining a toner.

Specific examples of the kneader for kneading the toner materials include, but are not limited to, a batch-type two-roll mixer; Banbury mixer; continuous double-screw extruders such as a KTK type double screw extruder (product of Kobe Steel, Ltd.), a TEM type double screw extruder (product of Toshiba Machine Co., Ltd.), a double screw extruder (product of KCK Co., Ltd.), a PCM type double screw extruder (product of Ikegai Co., Ltd.), and a KEX type double screw extruder (product of Kurimoto, Ltd.); and a continuous single-screw kneader such as Co-Kneader (product of Buss AG).

The cooled melt-kneaded product may be coarsely pulverized by a hummer mill or a Rotoplex and thereafter finely pulverized by a jet-type pulverizer or a mechanical pulverizer. Preferably, the pulverization is performed such that the resulting particles have an average particle diameter of from 3 to 15 μm.

When classifying the pulverized melt-kneaded product, a wind-power classifier may be used. Preferably, the classification is performed such that the resulting mother particles have an average particle diameter of from 5 to 20 μm.

The external additive is added to the mother particles by being stir-mixed therewith by a mixer, so that the external additive gets adhered to the surfaces of the mother particles while being pulverized.

Examples of the binder resin includes, but are not limited to, for example, a homopolymer of styrene such as polystyrene, poly-p-styrene, and polyvinyl toluene and a substituted product thereof; styrene-based copolymers such as a styrene-p-chlorostyrene copolymer, a styrene-propylene copolymer, a styrene-vinyl toluene copolymer, a styrene-methyl acrylate copolymer, a styrene-ethyl acrylate copolymer, a styrene-methacrylic acid copolymer, a styrene-methyl methacrylate copolymer, a styrene-ethyl methacrylate copolymer, a styrene-butyl methacrylate copolymer, a styrene-α-chloromethacrylic acid methyl copolymer, a styrene-acrylonitrile copolymer, a styrene-vinyl methyl ether copolymer, a styrene-vinyl methyl ketone copolymer, a styrene-butadiene copolymer, a styrene-isoprene copolymer, and a styrene-maleic acid ester copolymer; polymethyl methacrylate, polybutyl methacrylate, polyvinyl chloride, polyvinyl acetate, polyethylene, polyester, polyurethane, an epoxy resin, polyvinyl butyral, polyacrylic acid, rosin, modified rosin, a terpene resin, a phenol resin, an aliphatic or aromatic hydrocarbon resin, and an aromatic petroleum resin, and two or more of them may be used in combination.

Examples of the binder resin for pressure fixing include, but are not limited to, polyolefins such as low molecular weight polyethylene and low molecular weight polypropylene; olefin copolymers such as an ethylene-acrylic acid copolymer, an ethylene-acrylic acid ester copolymer, a styrene-methacrylic acid copolymer, an ethylene-methacrylic acid ester copolymer, an ethylene-vinyl chloride copolymer, an ethylene-vinyl acetate copolymer, and an ionomer resin; an epoxy resin, polyester, a styrene-butadiene copolymer, polyvinylpyrrolidone, a methyl vinyl ether-maleic anhydride copolymer, a maleic acid-modified phenol resin, and a phenol-modified terpene resin, and two or more of them may be used in combination.

Examples of colorant (pigment or dye) includes, but are not limited to, for example, yellow pigments such as cadmium yellow, mineral fast yellow, nickel titanium yellow, naples yellow, naphthol yellow S, Hansa yellow G, Hansa yellow 10G, benzidine yellow GR, quinoline yellow lake, permanent yellow NCG, and tartrazine lake; orange pigments such as molybdenum orange, permanent orange GTR, pyrazolone orange, Vulcan orange, indanthrene brilliant orange RK, benzidine orange G, and indanthrene brilliant orange GK; red pigments such as red iron oxide, cadmium red, permanent red 4R, lysol red, pyrazolone red, watching red calcium salt, lake red D, brilliant carmine 6B, eosin lake, rhodamine lake B, alizarin lake, and brilliant carmine 3B; violet pigments such as fast violet B and methyl violet lake; blue pigments such as cobalt blue, alkali blue, Victoria blue lake, phthalocyanine blue, metal-free phthalocyanine blue, partially chlorinated phthalocyanine blue, first sky blue, and indanthrene blue BC; green pigments such as chromium green, chromium oxide, pigment green B, and malachite green lake; azine-based pigments such as carbon black, oil-furnace black, channel black, lamp black, acetylene black, and aniline black, black pigments such as metal salt azo pigments, metal oxide, and composite metal oxide, and white pigments such as titanium oxide. Two or more of these pigments may be used in combination, and it is possible that they are not used in a case of the transparent toner.

Specific examples of a release agent include, but are not limited to, polyolefins such as polyethylene and polypropylene, fatty acid metal salts, fatty acid esters, paraffin waxes, amide waxes, polyvalent alcohol waxes, silicone varnishes, carnauba waxes, and ester waxes. Two or more of these materials may be used in combination.

The toner may further contain a charge controlling agent. Examples of the charge controlling agent includes, but are not limited to, nigrosine; azine-based dye having an alkyl group having 2 to 16 carbon atoms; basic dyes such as C.I.Basic Yellow 2 (C.I.41000), C.I.Basic Yellow 3, C.I.Basic Red 1 (C.I.45160), C.I.Basic Red 9 (C.I.42500), C.I.Basic Violet 1 (C.I.42535), C.I.Basic Violet 3 (C.I.42555), C.I.Basic Violet 10 (C.I.45170), C.I.Basic Violet 14 (C.I.42510), C.I.Basic Blue 1 (C.I.42025), C.I.Basic Blue 3 (C.I.51005), C.I.Basic Blue 5 (C.I.42140), C.I.Basic Blue 7 (C.I.42595), C.I.Basic Blue 9 (C.I.52015), C.I.Basic Blue 24 (C.I.52030), C.I.Basic Blue 25 (C.I.52025), C.I.Basic Blue 26 (C.I.44045), C.I.Basic Green 1 (C.I.42040), and C.I.Basic Green 4 (C.I.42000); lake pigments of these basic dyes; quaternary ammonium salt such as C.I.Solvent Black 8 (C.I.26150), benzoylmethylhexadecylammonium chloride, and decyltrimethylchloride; dialkyltin compound such as dibutyl and dioctyl; dialkyltin borate compound; guanidine derivative; polyamine resins such as vinyl-based polymer having an amino group and condensation-based polymer having an amino group; metal complex salt of monoazo dye; saltylic acid; metal complexes such as Zn, Al, Co, Cr, and Fe of dialkylsaltylic acid, naphthoic acid, and dicarboxylic acid; sulfonated copper phthalocyanine pigment; organic boron salt; fluorine-containing quaternary ammonium salt; and calixarene-based compound. Two or more of them may be used in combination. For color toners other than black toner, metal salts of salicylic acid derivatives, which are white, are preferred.

Specific examples of the external additive include, but are not limited to, inorganic particles such as silica, titanium oxide, alumina, silicon carbide, silicon nitride, and boron nitride; and resin particles such as polymethyl methacrylate particles and polystyrene particles having an average particle diameter of from 0.05 to 1 μm, obtained by soap-free emulsion polymerization. Two or more of these materials may be used in combination. Among these, metal oxide particles such as silica and titanium oxide whose surfaces are hydrophobized are preferred.

When a hydrophobized silica and a hydrophobized titanium oxide are used in combination with the amount of the hydrophobized titanium oxide greater than that of the hydrophobized silica, the toner provides excellent charge stability regardless of humidity.

Developer for Electrophotographic Image Formation

The developer for electrophotographic image formation according to this embodiment is used in the above-described image forming apparatus (developing apparatus). Specifically, the above-described two-component developer is used as the developer for electrophotographic image formation. Therefore, in the developer for electrophotographic image formation of this embodiment, the effect of the developing apparatus according to this embodiment may be obtained.

That is, by using the developer for electrophotographic image formation of this embodiment in the above-described developing apparatus, toner scattering can be reduced over a long period of time with less maintenance to obtain stable image quality. The two-component developer described above is an example of the developer for electrophotographic image formation.

Electrophotographic Image Forming Method

In the electrophotographic image forming method according to this embodiment, the above-described developer for electrophotographic image formation is used to form an image. Therefore, in the electrophotographic image forming method of this embodiment, the effect of the image forming apparatus (developing apparatus) according to this embodiment may be obtained.

In the electrophotographic image forming method of this embodiment, by using the above-described developer for electrophotographic image formation, toner scattering can be prevented over a long period of time with less maintenance, and stable image quality can be obtained.

Electrophotographic Image Forming Apparatus

The electrophotographic image forming apparatus according to this embodiment includes the above-described developer for electrophotographic image formation. Therefore, in the electrophotographic image forming apparatus of this embodiment, the effect of the developing apparatus according to this embodiment may be obtained.

Since the electrophotographic image forming apparatus of this embodiment includes the above-described developer for electrophotographic image formation, toner scattering can be reduced over a long period of time with less maintenance, and stable image quality can be obtained. The image forming apparatus 1 described above is also an example of the electrophotographic image forming apparatus.

EXAMPLES

Hereinafter, the present disclosure is described in more detail with reference to Examples and Comparative Examples. The present invention is not limited to these examples. In the following descriptions, “parts” represents “parts by mass” and “%” represents “% by mass”. Various examinations and evaluations are performed according to the following methods.

Preparation of Carrier

Carrier 1

Core Material

Mn ferrite (σ1,000:68 [$Am^2/kg$], average particle diameter 35 μm)

Composition of Resin Liquid 1 acrylic resin solution (solid concentration: 50%) 10 parts silicone resin solution (solid concentration: 50%) 190 parts toluene 500 parts aminosilane 2 parts barium sulfate (average particle diameter: 0.35 μm) 100 parts conductive filler (phosphorus-doped tin oxide) (powder specific resistance: 30 [Ω·cm]) 50 parts phosphoric acid ester-based dispersant 4 parts silicone-based defoamer (silicone content: 1%) 5 parts silicone cross-linking catalyst (dibutyltin acetate) 10 parts The materials of the resin solution 1 were dispersed for 10 minutes with a homomixer to prepare a resin layer forming solution. The resin layer forming solution of the resin solution 1 was applied to the surface of the core material at a rate of 30 g/min in an atmosphere at 60° C. with a SPIRA COTA® (manufactured by OKADA SEIKO CO., LTD.) so as to have a thickness of 0.5 μm, and dried. The thickness of the resulting layer was adjusted by adjusting the amount of the resin liquid. The obtained carrier was baked at 200° C. for one hour in an electric furnace, cooled, and then crushed using a sieve with a mesh size of 100 μm to obtain a carrier 1.

Carrier 2

A carrier 2 was obtained in a manner similar to that of the carrier 1 except that 100 parts of barium sulfate of the carrier 1 was changed to 50 parts.

Carrier 3

A carrier 3 was obtained in a manner similar to that of the carrier 1 except that 100 parts of barium sulfate of the carrier 1 was changed to 100 parts of magnesium oxide (average particle diameter: 0.35 μm).

Carrier 4

A carrier 4 was obtained in a manner similar to that of the carrier 1 except that 100 parts of barium sulfate of the carrier 1 was changed to 100 parts of magnesium hydroxide (average particle diameter: 0.3 μm).

Carrier 5

A carrier 5 was obtained in a manner similar to that of the carrier 1 except that 100 parts of barium sulfate of the carrier 1 was changed to 100 parts of hydrotalcite (average particle diameter: 0.4 μm).

Carrier 6

A carrier 6 was obtained in a manner similar to that of the carrier 1 except that 100 parts of barium sulfate of the carrier 1 was changed to 100 parts of zinc oxide (average particle diameter: 0.4 μm).

Carrier 7

A carrier 7 was obtained in a manner similar to that of the carrier 1 except that 100 parts of barium sulfate of the carrier 1 was changed to 100 parts of alumina (average particle diameter: 0.35 μm).

Carrier 8

A carrier 8 was obtained in a manner similar to that of the carrier 1 except that 100 parts of barium sulfate of the carrier 1 was changed to 0 parts.

Formulation of the carriers 1 to 8 is illustrated in Table 1.

TABLE 1

| s | Acrylic resin solution (solid content 50 wt %) [parts by mass] | Silicon resin solution (solid content 50 wt %) [parts by mass] | Toluene [parts by mass] | Amino silane [parts by mass] | Chargeable filler Type | Chargeable filler [parts by mass] | Conductive filler phosphorus-doped tin oxide [parts by mass] | Phosphoric acid ester-based dispersant [parts by mass] | Silicon-based defoamer [parts by mass] | Dibutyltin acetate [parts bu mass] |
|---|---|---|---|---|---|---|---|---|---|---|
| Carrier 1 | 10 | 190 | 500 | 2 | Barium sulfate 0.35 μm | 100 | 50 | 4 | 5 | 10 |
| Carrier 2 | 10 | 190 | 500 | 2 | Barium sulfate 0.35 μm | 50 | 50 | 4 | 5 | 10 |
| Carrier 3 | 10 | 190 | 500 | 2 | Magnesium oxide 0.35 μm | 100 | 50 | 4 | 5 | 10 |
| Carrier 4 | 10 | 190 | 500 | 2 | Magnesium hydroxide 0.3 μm | 100 | 50 | 4 | 5 | 10 |
| Carrier 5 | 10 | 190 | 500 | 2 | Hydrotalcite 0.4 μm | 100 | 50 | 4 | 5 | 10 |
| Carrier 6 | 10 | 190 | 500 | 2 | Zinc oxide 0.4 μm | 100 | 50 | 4 | 5 | 10 |
| Carrier 7 | 10 | 190 | 500 | 2 | Almina 0.35 μm | 100 | 50 | 4 | 5 | 10 |
| Carrier 8 | 10 | 190 | 500 | 2 | — | — | 50 | 4 | 5 | 10 |

Regarding the carriers 1 to 8, concentration (Ba detection amount) of the barium element in the XPS analysis on the carrier surface was measured. Results of the Ba detection amount are illustrated in Table 2.

TABLE 2

| | Ba detection amount on carrier surface [atomic %] |
|---|---|
| Carrier 1 | 0.37 |
| Carrier 2 | 0.27 |
| Carrier 3 | 0 |
| Carrier 4 | 0 |
| Carrier 5 | 0 |
| Carrier 6 | 0 |
| Carrier 7 | 0 |
| Carrier 8 | 0 |

Regarding Examples 1 to 10 and Comparative Examples 1 to 5 using the carriers 1 to 8, evaluation was made using a modified commercially available digital full-color multifunction peripheral (IMAGIO® MP C5002 manufactured by Ricoh Co., Ltd.).

A configuration of IMAGIO® MP C5002 is substantially similar to that of FIGS. 1 to 3. A hole of 1 cm×20 cm for attaching a filter was made immediately above a screw for refluxing the developer of the developing device of FIG. 2, and various filters were attached for evaluation.

An upper portion of the filter was sealed and the air could be discharged by a tube and a pump so that the air in the developing device was discharged from the filter portion of the developing unit in order to make the airflow sucked from the gap of the developing sleeve.

Toner Scattering

The carriers 1 to 8 and toners of four colors of IMAGIO® MP C5002 were mixed so that the toner concentration was 7%, respectively, to produce the developer, and the developer was set in an apparatus (digital full-color multifunction peripheral).

Note that 100,000 images each having an image area of 5% of each of black, yellow, magenta, and cyan toners were output, and toner scattering was evaluated.

The toner accumulated in a lower portion of the developing unit was sucked to be recovered, and mass of the toner was measured. Contamination of an inside of the machine, a modified pump, and a portion of a wall on which an exhaust airflow from the pump hits were evaluated. The evaluation criteria are as follows. A and B are evaluated as good, and C is evaluated as poor.

A: No toner is visually scattered and no toner sticks to a waste when wiped with the waste. B: No toner is visually scattered and slight toner sticks to the waste when wiped with the waste. C: Scattering toner adhesion is visually recognized.

Table 3 illustrates a combination of the filter and the carrier (Examples 1 to 8 and Comparative Examples 1 to 5) and the evaluation results of the toner scattering.

TABLE 3

| | | Filter | | | Toner scattering | | | |
|---|---|---|---|---|---|---|---|---|
| | Carrier | Thickness [mm] | Filter structure | Pressure loss [pa] | Developing unit lower portion [mg] | In machine | Ventilation pump | Wall |
| Example 1 | Carrier 1 | 10 | With density gradient | 10 | 1 | A | A | A |
| Example 2 | Carrier 1 | 3 | With density gradient | 8 | 2 | A | A | A |
| Example 3 | Carrier 1 | 15 | With density gradient | 12 | 2 | A | A | A |
| Example 4 | Carrier 1 | 10 | With density gradient | 3 | 1 | A | A | B |
| Example 5 | Carrier 1 | 10 | With density gradient | 35 | 5 | A | A | A |
| Example 6 | Carrier 2 | 10 | With density gradient | 10 | 6 | A | A | A |
| Example 7 | Carrier 3 | 10 | With density gradient | 10 | 7 | B | A | A |
| Example 8 | Carrier 4 | 10 | With density gradient | 10 | 6 | B | A | A |
| Example 9 | Carrier 5 | 10 | With density gradient | 10 | 8 | B | A | A |
| Example 10 | Carrier 6 | 10 | With density gradient | 10 | 12 | B | A | A |
| Comparative example 1 | Carrier 1 | 0.1 | Unique film filter | 10 | 60 | C | A | A |
| Comparative example 2 | Carrier 1 | 10 | With density gradient | 1 | 1 | A | C | C |
| Comparative example 3 | Carrier 1 | 10 | With density gradient | 50 | 25 | C | A | A |
| Comparative example 4 | Carrier 7 | 10 | With density gradient | 10 | 43 | C | A | A |
| Comparative example 5 | Carrier 8 | 10 | With density gradient | 10 | 57 | C | A | A |

As may be seen from Table 3, in the developing apparatus (image forming apparatus) of the present embodiment, toner scattering is reduced, maintenance is not needed for a long period of time, and abnormality of the image forming apparatus is less likely to occur.

Although example embodiments of the present invention have been described above, the present invention is not limited to the above-described embodiments, and various modifications and changes may be made within the scope of the invention.

The invention claimed is:

1. A developing apparatus, comprising:

an electrostatic latent image bearer to bear an electrostatic latent image on a surface of the electrostatic latent image bearer;

a developing sleeve to:

attract a two-component developer containing a toner and a magnetic carrier to a surface of the developing sleeve by a magnetic force to form a magnetic brush; and rub the magnetic brush against the surface of the electrostatic latent image bearer to develop the electrostatic latent image on the surface of the electrostatic latent image bearer into a toner image;

a case that accommodates the two-component developer and the developing sleeve; and an air filter attached to the case, the air filter having a thickness of 2 to 20 mm and having a density gradient with a pressure loss of 2 to 40 Pa at a wind speed of 10 cm/s, the air filter to:

form an airflow sucked into the case from a gap between the developing sleeve and the case; and form an airflow discharged from the case through the air filter, the two-component developer accommodated in the case containing a magnetic particle a surface of which is coated with a resin layer, and the resin layer containing at least one type of chargeable particle.

2. The developing apparatus according to claim 1, wherein the at least one type of chargeable particle includes at least one type of inorganic particle selected from barium sulfate, zinc oxide, magnesium oxide, magnesium hydroxide, and hydrotalcite.

3. The developing apparatus according to claim 1, wherein the at least one type of chargeable particle includes barium sulfate.

4. The developing apparatus according to claim 3, wherein a concentration of a barium element on a surface of the magnetic carrier contained in the two-component developer by XPS analysis is 0.2 atomic % or larger.

5. The developing apparatus according to claim 1, further comprising a fan to form a path through which air is discharged.

* * * * *